C. TREXLER.
Gate.
No. 66,421.
Patented July 2, 1867.
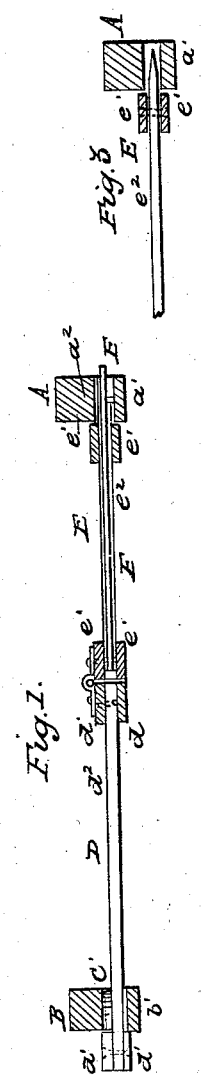
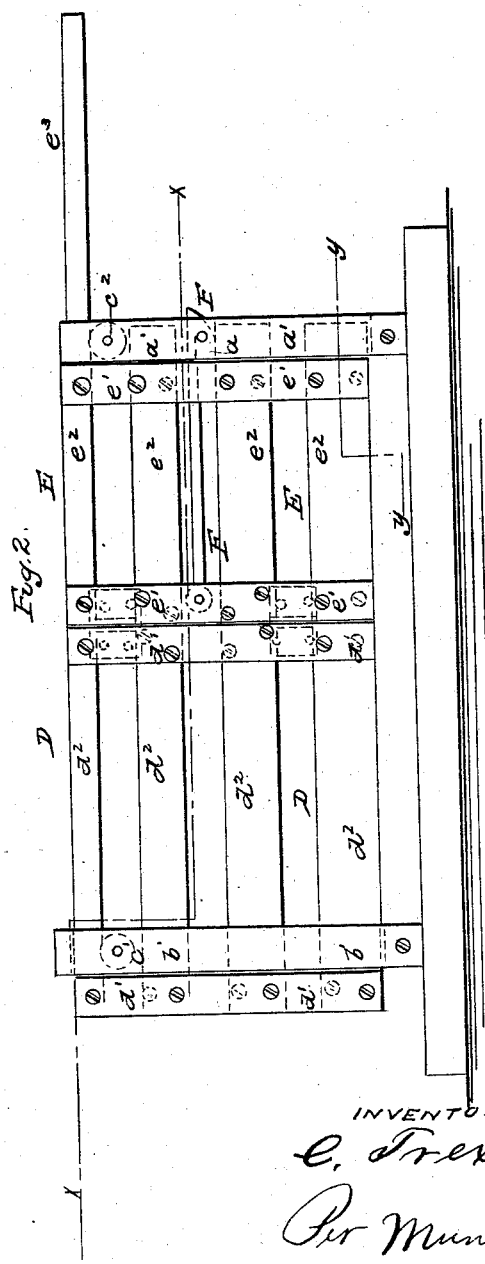

United States Patent Office.

CORNELIUS TREXLER, OF LA GRANGE, INDIANA.

Letters Patent No. 66,421, dated July 2, 1867.

---

IMPROVEMENT IN GATES.

---

*The Schedule referred to in these Letters Patent and making part of the same.*

---

TO ALL WHOM IT MAY CONCERN:

Be it known that I, CORNELIUS TREXLER, of the city and county of La Grange, and State of Indiana, have invented a new and useful Improvement in Gates; and I do hereby declare that the following is a full, clear, and exact description thereof, which will enable those skilled in the art to make and use the same, reference being had to the accompanying drawings, forming part of this specification, in which—

Figure 1 is a detail sectional view of my improved gate, taken through the line $x\ x$, fig. 2.

Figure 2 is a side view of the same.

Figure 3 is a detail sectional view of the same, taken through the line $y\ y$, fig. 2.

Similar letters of reference indicate corresponding parts.

My invention has for its object to furnish an improved gate, so constructed and arranged that it may be opened to its full extent without its being necessary to slide the gate back its entire length, or swing the entire gate upon its hinges; and it consists in the construction of the gate, and in the manner in which it is connected with the posts and operated.

A is the front, and B is the rear gate-post, which posts are set in the ground in the ordinary manner. $a'$ and $b'$ are supplementary posts or bars, which are pinned or otherwise secured to the sides of the posts A and B, at such a distance from them that the horizontal bars of the gate may move back and forth freely through the intervening space, but the vertical bars will be unable to pass through. $C^1\ C^2$ are pulleys pivoted between the posts A and B and the bars $a'$ and $b'$, at such a distance below their upper ends that the top horizontal bar of the gate may ride upon them as the gate is moved back and forth. D and E are two small gates, formed by attaching vertical cross-bars $d^1$ and $e^1$ to the ends of the horizontal bars $d^2$ and $e^2$, as shown in figs. 1 and 2. The gates D and E are hinged to each other, as shown, so as to form one large gate. The gate D is connected with the post B in such a way that the horizontal bars $d^2$ may pass between the post B and the bar $b^1$, the rear vertical cross-bar $d$ being upon the rear of the post B, as shown in figs. 1 and 2. The upper horizontal bar $e^3$ of the gate E should extend from four to six feet beyond the post A, according to the length of the gate D, so that as the gate is pushed back the length of the gate D, the said extended bar $e^3$ may ride upon the pulley $C^2$. F is the latch, the rear end of which is pivoted between the rear cross-bars $e^1$ of the gate E, and its forward end or catch projects in front, so as to enter the space between the post A and bar $a^1$, and catch upon the catch-pin $a^2$, as shown in fig. 2. The front ends of the horizontal bars $e^2$ project in front of the front vertical cross-bars $e^1$, so as to enter the space between the post A and bar $a^1$, so as to enable the gate to resist any side pressure when closed. The projecting ends of the bars $e^2$ are bevelled off, or made wedge-shaped, as shown in fig. 3, so that when the gate is closed they may readily enter the space between the post A and bar $a'$.

In opening the gate the entire gate is pushed back until the front vertical cross-bars $d^1$ of the gate D strike against the post B. The projecting end $e^3$ of the upper horizontal bar of the gate E is then lifted from the post A, and the gate E swung around so as to be at right angles with the gate D, leaving the gateway unobstructed.

I claim as new, and desire to secure by Letters Patent—

The combination and arrangement of the gates D and E, constructed as described, gate-posts A and B, bars $a^1$ and $b'$, pulleys $C^1\ C^2$ and projecting bar $e^3$, with each other, substantially in the manner herein shown and described, and for the purpose set forth.

The above specification of my invention signed by me this 10th day of April, 1867.

CORNELIUS TREXLER.

Witnesses:
A. B. KENNEDY,
J. M. CHURCH.